US009355227B2

(12) United States Patent
Pathak (10) Patent No.: US 9,355,227 B2
(45) Date of Patent: May 31, 2016

(54) DYNAMIC DOCUMENT DISPLAY PERSONALIZATION IMPLEMENTED IN A DIGITAL RIGHTS MANAGEMENT SYSTEM

(71) Applicant: KONICA MINOLTA LABORATORY U.S.A., INC., San Mateo, CA (US)

(72) Inventor: Rabindra Pathak, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 41 days.

(21) Appl. No.: 14/319,097

(22) Filed: Jun. 30, 2014

(65) Prior Publication Data
US 2015/0379244 A1    Dec. 31, 2015

(51) Int. Cl.
| | |
|---|---|
| *G06F 17/30* | (2006.01) |
| *G06F 21/10* | (2013.01) |
| *G06F 21/62* | (2013.01) |
| *G06F 3/0482* | (2013.01) |
| *G06F 3/0484* | (2013.01) |
| *G06F 17/21* | (2006.01) |

(52) U.S. Cl.
CPC .............. *G06F 21/10* (2013.01); *G06F 3/0482* (2013.01); *G06F 3/04842* (2013.01); *G06F 17/211* (2013.01); *G06F 21/6218* (2013.01)

(58) Field of Classification Search
CPC ... G06F 21/10; G06F 21/6218; G06F 3/0482; G06F 3/04842; G06F 17/211

USPC ............................................................ 726/28
See application file for complete search history.

(56) References Cited

U.S. PATENT DOCUMENTS

| | | | |
|---|---|---|---|
| 8,447,747 B1 | 5/2013 | Yi et al. | |
| 2005/0246328 A1 | 11/2005 | Zhang et al. | |
| 2006/0047643 A1* | 3/2006 | Chaman ............ | G06F 17/30867 |
| 2007/0130145 A1 | 6/2007 | Pedersen et al. | |
| 2008/0183870 A1 | 7/2008 | Singh et al. | |
| 2009/0018996 A1* | 1/2009 | Hunt ..................... | G06Q 30/02 |
| 2009/0172021 A1 | 7/2009 | Kane et al. | |
| 2010/0115428 A1 | 5/2010 | Shuping et al. | |

* cited by examiner

*Primary Examiner* — Kambiz Zand
*Assistant Examiner* — Aubrey Wyszynski
(74) *Attorney, Agent, or Firm* — Chen Yoshimura LLP (57) ABSTRACT

A method for displaying a digital document to a user where the display sequence of the pages of the document is personalized based on the user's past interactions with the document, such as viewing, annotating, editing, sharing, etc. on each pages. As user interacts with the document, the viewer application on the client computer reports the user interactions to a server. Through analytics, the server can decide the importance of individual pages and rank the pages accordingly, and sends page ranking information back to the client. The viewer application on the client can then render the document where pages are ordered based on the ranking, which reflects the user's interest in these pages. Different modes of reorganizing a document based on user interaction history are provided, so that the pages can be displayed in sequences based on the frequency of certain types of user interactions.

19 Claims, 5 Drawing Sheets

Fig. 1

| Page # | Importance Score | # of annotations | # of prints | # of copy/cut and paste | # of edits | # of views |
|---|---|---|---|---|---|---|
| 1 | | | | | | |
| 2 | | | | | | |
| 3 | | | | | | |
| ...... | | | | | | |

DYNAMIC DOCUMENT DISPLAY PERSONALIZATION IMPLEMENTED IN A DIGITAL RIGHTS MANAGEMENT SYSTEM

BACKGROUND OF THE INVENTION

1. Field of the Invention

This invention relates to digital document display and management, and in particular, it relates to a method and related apparatus for dynamically personalizing the display sequence of a document for individual users.

2. Description of Related Art

In a digital rights management system (DRM or RMS) for digital documents, the documents are registered on a rights management server (RMS server), along with associated rights management policies that define the users' access rights to the documents. Users' access to the documents is controlled by the RMS server. In one particular RMS system, each copy of a digital document, such as a PDF document, has metadata embedded in it that includes a license ID or document ID. When a user attempts to open such a document using a viewer application, such as Adobe Reader™, the viewer application contacts the RMS server; the RMS server determines, based on stored digital rights management information including the rights management policy associated with the document, whether the requesting user has access rights to the document. Based on a reply from the RMS server, the viewer application will open the document for viewing (or other actions such as printing, copying, etc.) by the user, or deny the access.

SUMMARY

Embodiments of the present invention are implemented in an RMS system to provide more personalized display sequences (page sequence, chapter sequence, section sequence, etc.) for displaying digital documents to individual users.

An object of the present invention is to create a more personalized reading experience of digital documents for users.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a system comprising a server computer connected with a client computer for personalized display of a digital document by the client to a user, the method including: by the server computer: receiving, from the client computer, user interaction information regarding interactions of the user with the document, the interactions including one or more types of interactions selected from a group consisting of: viewing a page of the document, making a note on a page, printing a page, modifying a page, sharing a page with others, copying or cutting content from a page and pasting it in another document, navigating to a page while viewing another document, and navigating from a page to another document; storing the user interaction information in association with a user ID of the user and a document ID of the document; generating page ranking information based on the stored user interaction information, the page ranking information being either one or more scores for each page of the document, or one or more page sequences of the document; and transmitting the page ranking information to the client computer in response to a request from the client computer.

The method may also includes, by the client computer: displaying the document on a screen; transmitting the user interaction information to the server computer; receiving the page ranking information from the server computer; and displaying pages of the document in a sequence according to the page ranking information.

In another aspect, the present invention provides a method implemented on a client computer connected with a server computer for performing personalized display of a digital document to a user, including: displaying the document on a screen; transmitting, to the server computer, user interaction information regarding interactions of the user with the document, the interactions including one or more types of interactions selected from: viewing a page of the document, making a note on a page, printing a page, modifying a page, sharing a page with others, copying or cutting content from a page and pasting it in another document, navigating to a page while viewing another document, and navigating from a page to another document; receiving page ranking information from the server computer, the page ranking information being either one or more scores for each page of the document, or one or more page sequences of the document, the page ranking information having been generated by the server computer based on the user interaction information transmitted by the client computer to the server computer; and displaying pages of the document in a sequence according to the page ranking information.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
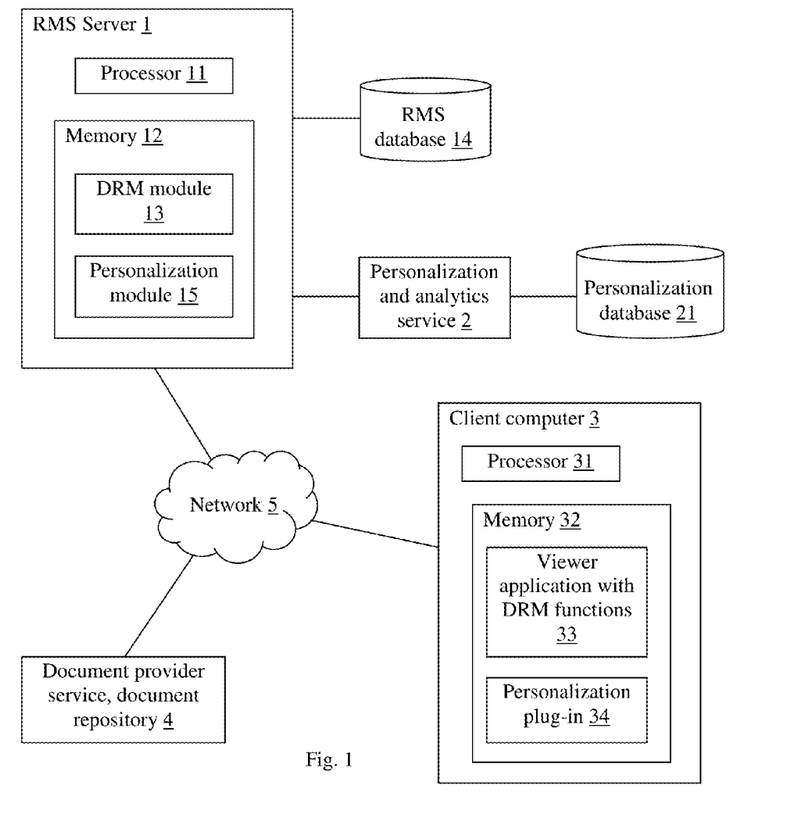
FIG. 1 is schematically illustrates a digital rights management system which implements various embodiments of the present invention.

FIG. 1 schematically illustrates a system which implements the document display personalization method according to embodiments of the present invention. The system includes a server computer 1 (an RMS server in this example), a personalization service 2 connected to the server 1, and a client computer 3 connected to the server via a network 5 such as the Internet. The general structures of the server computer 1 and the client computer 3 include respective processors 11 and 31 and respective memories 12 and 32 storing programs executed by the respective processors to perform various functions described in more detail below. The personalization service 2 may be implemented on another server computer separate from the RMS server (in the configuration shown in FIG. 1) or as a program module running on the RMS server 1.

The server 1 has a digital rights management (DRM) program module 13 which performs DRM functions, such as those described in the Background section above, and an RMS database 14 including information relevant for the DRM functions, such as rights management policies, a registered user database, a document database that associate each document ID with a policy ID, etc. The server 1 also includes a personalization module 15 which communicates with personalization service 2 to perform various functions related to document display personalization as will be described in more detail later. The personalization service 2 maintains a personalization database 21 storing information related to document display personalization as will be described in more detail later. When the personalization service is a part of the RMS server 1, the RMS database 14 and the personalization database 21 may be stored in the same storage device.

The RMS system also includes a document provider service and a document repository 4, which may be implemented by servers and storage devices in any suitable configuration. The document provider service cooperates with the server 1 to generate DRM protected documents, and provides DRM protected documents to users (client computers 3).

When a user of the client computer 3 attempts to open a DRM protected document, for example by using a viewer application 33, the viewer application cooperates with the RMS server 1 to determine whether the user is permitted to access the document. In this process, the viewer application transmits to the RMS server the user ID of the user and the document ID of the document to be accessed, and the server 1 determines whether the user is permitted access and transmits a reply to the viewer application. Because the RMS server has the user ID and document ID, it can store information of the user's interaction with the document in association with the user ID and document ID, and use that information to personalize the display sequences of the document for the user.

Figure 2:
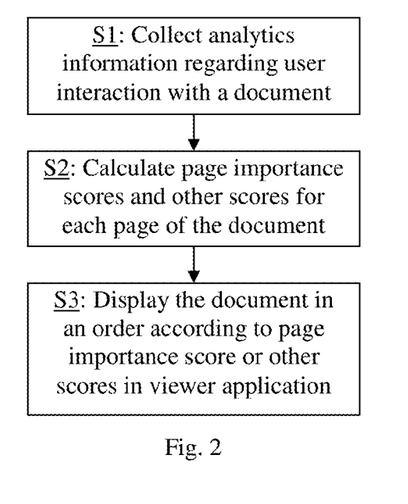
FIG. 2-4 schematically illustrate a method for customizing display sequences when viewing a digital document according to an embodiment of the present invention.

As shown in FIG. 2, the document display personalization method according to embodiments of the present invention includes three main processes: First (step S1), collecting and storing information regarding user interactions with documents; second (step S2), calculating page ranking based on the collected user interaction information; and third (step S3), based on the page ranking information, implementing personalized display sequence in the viewer application on the client computer. These processes are described in more detail with reference to FIGS. 3-4.

Figure 3:
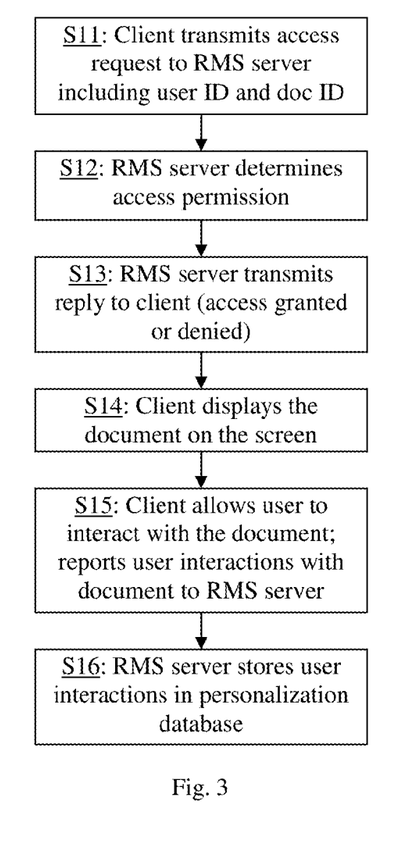

FIG. 3 schematically illustrates the collecting and storing of information regarding user interactions with documents (step S1). As shown in FIG. 3, when the user attempts to access a document on the client computer 3, such as by attempting to open it with the viewer application 33, the client computer transmits an access request to the server which includes the user ID of the user and the document ID (or license ID) of the document (step S11). Based on the user ID and document ID (or license ID), the server determines whether access should be granted by referring to the information stored in the RMS database 14 (step S12). The server transmits a reply to the client to indicate whether access permission is granted or denied (step S13), and if the permission is granted, the client opens the document and displays it on the screen of the client (step S14).

Then, during the user's viewing session of the document, the user interacts with the document through the viewer application, and the client reports to the RMS server information regarding the user's interactions with the document (step S15). The types of user interactions (events) reported to the RMS server include: viewing a page of the document (i.e. navigating to a page), making a note (annotation) on a page, printing a page, modifying a page (saving changes on a page), sharing a page with others (using email or other types of messages), copying or cutting content from a page and pasting it in another document, navigating to a page while viewing another document, or navigating from a page to another document, etc.

The personalization module 15 of the RMS server 1 forwards the user interaction information to the personalization service 2, and the personalization service 2 records it in the personalization database 21 in association with the user ID and document ID (step S16).

Figure 5:
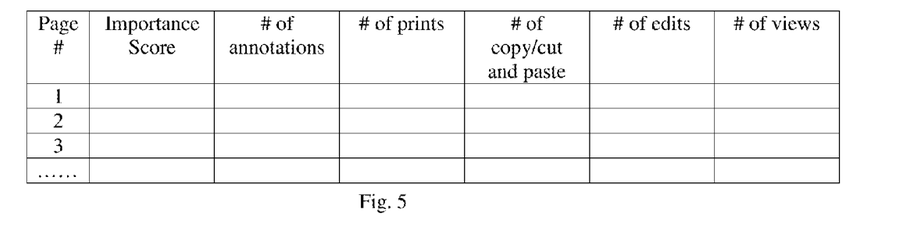
FIG. 5 schematically illustrates a table storing user interaction information and page ranking information according to an embodiment of the present invention.

In the calculation process (step S2), the personalization service 2 analyzes the user interaction information in the personalization database 21 to generate various page rankings for particular documents with respect to particular users. For example, the pages of the document can be ranked according to any one of the following factors or scores for each page: an importance score of the page; the number of notes within the page, the number of times the page is viewed, the number of times the page is edited, and the number of times the page is printed, etc. Except for the importance score, the other scores can be derived directly from the number of user interactions reported by the client and stored in the personalization database. The importance score for each page may be calculated as a weighted sum of multiple types of user interactions, such as the ones listed above in connection with step S15. The weighted sum can be expressed as:

$$\text{Page Importance Score } S(p) = \Sigma_i W_i * N_i(p)$$

where p is the page number, i is an index of the type of user interactions, $W_i$ are the weights given to the types of user interactions, and $N_i(p)$ are the cumulative number of times the user performed that type of interaction on that page. Any suitable weights may be given to the various types of user interactions. In one particular example, the following types of user interactions are used to calculate the page importance score and they are given declining weights in the this order: annotation, print, copy or cut and paste, edit, share, and view. The page importance score represents the level of interest the user has in a given page. In the personalization database 21, for each document and with respect to each user that has accessed that document, the page importance score and the other scores (number of notes, etc.) are stored for each page of the document. FIG. 5 schematically illustrates an example of a table storing the various scores for each page of a document.

The calculation (step S2) may be performed dynamically, i.e., each time a user interaction report is received from the client, the importance score and the other scores for the affected page are re-calculated. Alternatively, the user interaction reports received from the client during a viewing session are recorded, and the calculations in step S2 are performed once after the user closes the document.

Figure 6A:
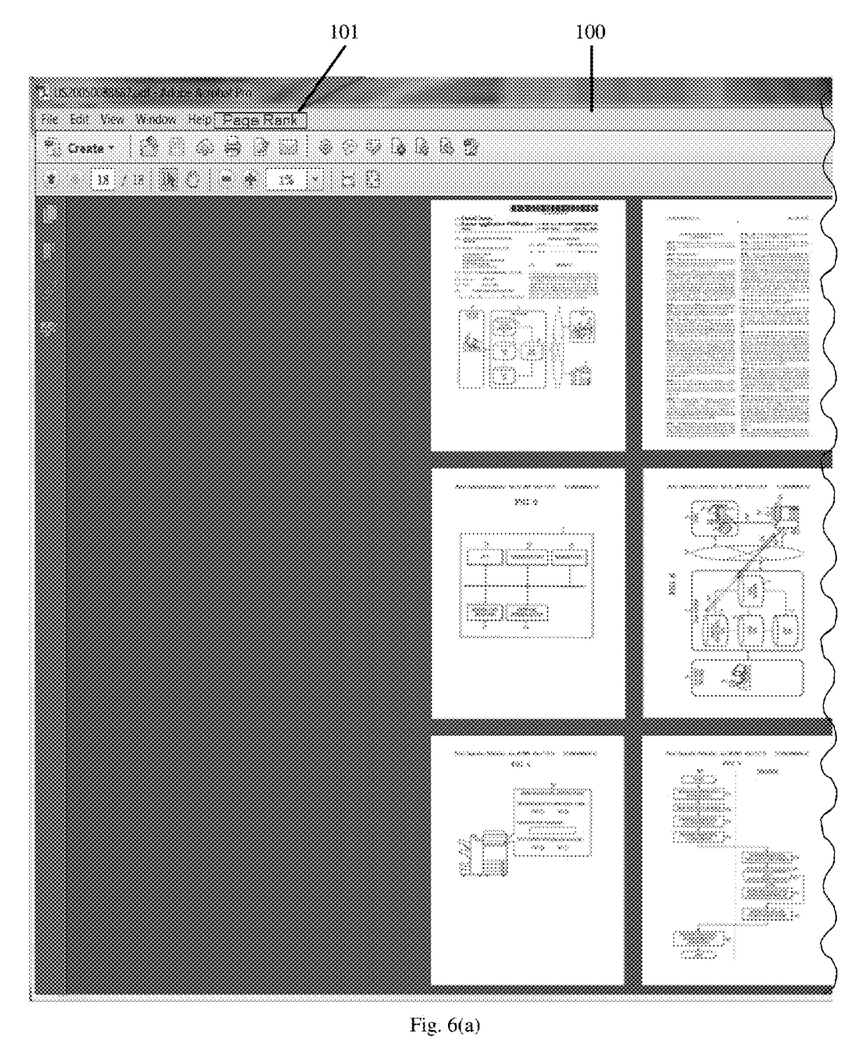
FIGS. 6(a)-6(c) schematically depict display screens showing personalized display sequences under various ranking modes according to an embodiment of the present invention.
Figure 6B:
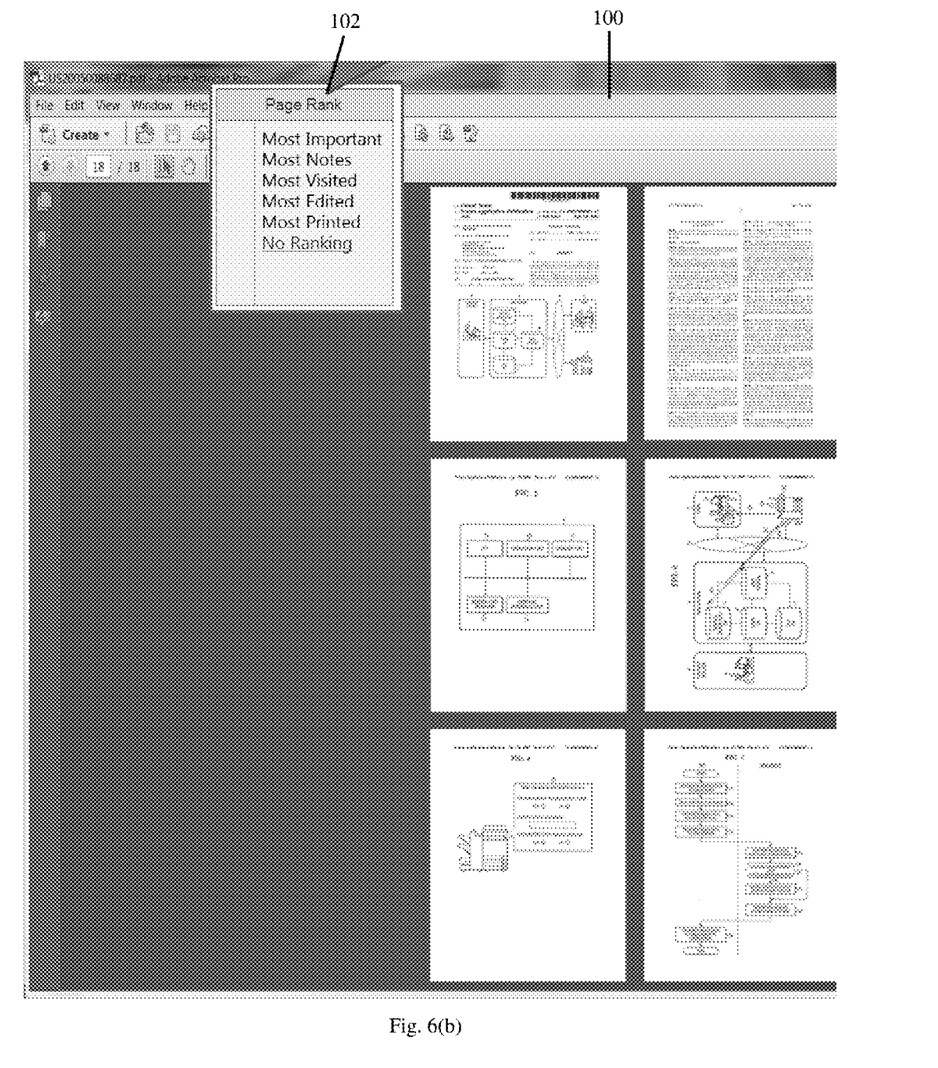
Figure 6C:
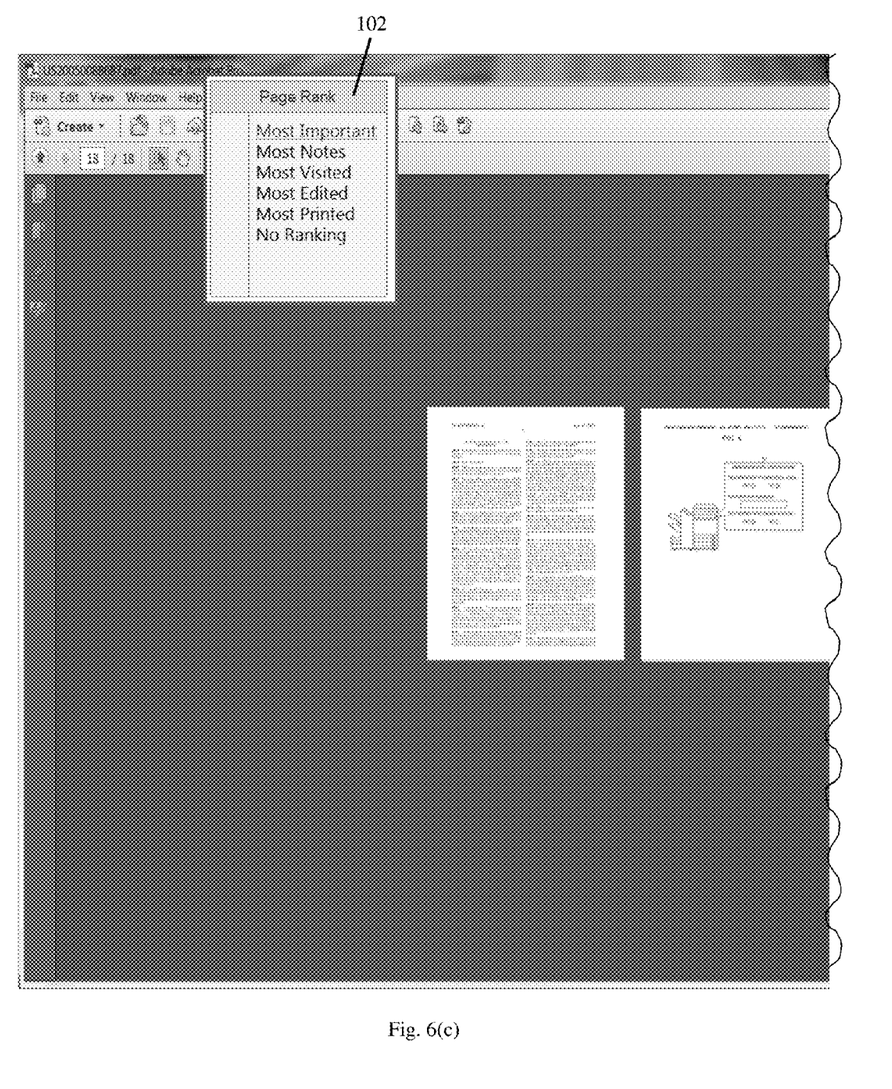

After the user interaction information is collected and the page importance score and other scores are calculated, the client computer can display the digital document to the user using a page sequence based on the page importance score or any of the other scores. For example, as shown in the screenshots in FIGS. 6(*a*)-6(*c*), the display window 100 of the viewer application (a PDF reader application in this example) is provided with a menu item 101 labeled "Page Rank" that allows the user to choose to display the pages of the documents in a sequence based on one of the scores. When the user clicks on the "Page Rank" menu item 101 (FIG. 6(*a*)), a sub-menu 102 is displayed (FIG. 6(*b*)), listing the various ranking modes based on the various scores, which the user can choose from. In the example shown in FIGS. 6(*b*) and 6(*c*), the ranking modes are: Most Important, Most Notes, Most Visited, Most Edited, Most Printed, and No Ranking. The "No Ranking" mode is initially chosen by default (FIG. 6(*b*)), and the document is displayed according to its native page order. If the user chooses the "Most Important" ranking mode (FIG. 6(*c*)), for example, the pages will be displayed in a sequence according to their page importance score (i.e. the page with the highest importance score will be displayed first, etc.). If the user chooses the "Most Notes" mode, the pages will be displayed in an order according to the number of user notes on each page (i.e. the page with the most notes will be displayed first, etc.), etc. When multiple pages have the same score (for example, many pages may have zero notes), these pages can be displayed according to the native page order of the document.

Here, when the document is said to be displayed in a particular pages sequence, the pages of the documents are displayed on the screen one (or a few) pages at a time and the user can use a navigation tool to go to the next page (or next few pages) in the sequence or the previous page (or previous few pages) in the sequence.

Figure 4:
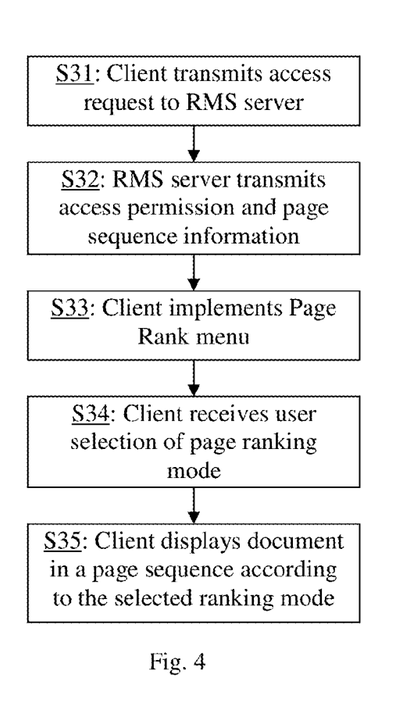

The personalized display sequence is realized by the client 3 and the server 1 which cooperate with each other. As shown in FIG. 4, when the client 3 transmits an access request to the RMS server (step S31), and the RMS server 1 determines that access permission should be granted, the personalization service 2 retrieves (from the personalization database 21) page ranking information and transmits it to the client 3 via the RMS server 1 (step S32).

In one embodiment, the page ranking information transmitted by the personalization service 2 to the client 3 is in the form of page sequences, i.e. a sequence of page numbers, for each page ranking mode. For example, the page sequence for the "Most Notes" mode will be p1, p2, p3, ... if page p1 has the most number of notes, page p2 has the next most number of notes, etc. In one implementation, the personalization service 2 calculates the page sequences, by sorting the pages according to each score, before the document access request is received and store the page sequence in the personalization database 21. In such a case, in step S32, the personalization service 2 only needs to retrieve the page sequences from the personalization database 21 and transmit them to the client. In another implementation, the personalization database 21 only stores the various scores for pages of the document, for example in the form of a table shown in FIG. 5; in such a case, in step S32, the personalization service 2 will retrieve the scores and sort the pages according to each score to generate the sequence of pages for transmission to the client.

In an alternative embodiment, the page ranking information transmitted from the personalization service 2 to the client 3 is in the form of the scores for each page, for example in the form of a table shown in FIG. 5, i.e. in substantially the same form as how the user interaction information is stored in the personalization database 21. In such a case, in step S32, the personalization service 2 only needs to retrieve the stored scores from the personalization database 21 and transmit them to the client 3, and the client will perform the sorting to generate the page sequence corresponding to each score.

In either case, the page ranking information does not include the content of the pages of the document.

The client 3 implements the Page Rank menu (step S33), and receives a user input via the menu which selects one of the ranking modes (step S34). The client 3 reorders the original digital document for the selected ranking mode based on the page ranking information, and renders the document (step S35). As mentioned earlier, if the page ranking information received from the server is not already in the form of page sequences, the client needs to generate the page sequence for the selected raking mode by sorting the page numbers according to the score corresponding to the ranking mode as a part of step S35.

In the above descriptions, the processes of collecting user interaction information (step S1) and displaying the document by page ranking (step S3) are explained separately with reference to FIGS. 3 and 4. In practice, these two processes may occur concurrently during a document viewing session. In other words, each time the user opens the document, the page ranking information (if it exists) is transmitted by the personalization service 2 to the client 3, and the client can implement personalized page ranking (steps S33 to S35) when the user views the document. In the mean time, during the viewing session, the client 3 also reports user interactions with the document to the personalization service 2 (steps S15).

In one embodiment, the page ranking information is transmitted to the client 3 only once, at the time the document is opened, and is not updated during the current viewing session; the page ranking is done based on the page ranking information received by the client at the time the document is opened. The user interaction information is reported the server either at the time of closing the document or in real time during the viewing session, but the calculation of the various scores (step S2) is carried out only after the document is closed; the updated data is stored in the personalization database 21 to be used when the user opens the document the next time.

In another embodiment, the user interaction information is reported to the server in real time during the viewing session; the various scores are continuously updated as the user interaction information is received by the personalization service 2 and the personalization database 21 is continuously updated; the updated page ranking information is continuously transmitted to the client during the viewing session. Thus, in this embodiment, the page ranking of the pages of the document can continue to change during the viewing session.

On the client 3, the function of reporting user interaction to the server 1 and the function of personalized display sequences with the effects shown in FIGS. 6(*a*)-6(*c*) can be implemented by a personalization plug-in module 34 of the viewer application 33. As advantage of using a plug-in is that the viewer application 33, which is typically a program already installed on the client 3, does not need to be modified; the plug-in program can be separately loaded onto the client 3. Likewise, as mentioned earlier, the personalization module 15 may be installed on RMS server 1 as an add-on module, with the similar advantage that the DRM module on the server does not need to be modified.

The plug-in module 34 on the client 3 can be enhanced to support additional user actions. For example, the client plug-in 34 may implement a function to allow the user to manually assign a page importance score to pages of the document, which will override the page importance score calculated by the personalization service 2 based on stored user interactions. In another example, the client plug-in 34 may allow the user to manually assign a predefined low page importance score (e.g. −1 in the example where the page importance score is 0 for pages that have no user interactions recorded for them) to a page, and the plug-in will hide pages with this low importance score, i.e. not display them to the user in the "Most Important" ranking mode. In another example, the client plug-in 34 may be implemented to hide all pages that the user has never accessed, e.g. pages with scores of zero, except in the "No Ranking" mode. In yet another example, the client plug-in 34 may implement a function to allow the user to manually specify the page sequence in which the pages will be displayed. In these examples, any re-sorting calculation required to generate the updated page sequences based on modified scores may be done either by the client 3 or by the personalization service 2. If done by the client 3, the personalization service 2 will be required to transmit all scores to the client initially, and the client may transmit the updated scores back to the personalization service. If done by the personalization service 2, the client 3 will be required to transmit the user's manually entered information to the personalization service, and latter will transmit the updated page sequence to the client. Those skilled in the relevant art can implement these functions in suitable ways without undue experimentation.

In one embodiment, when the document is a PDF document, multiple layers may be used, so that highly ranked pages are displayed in one layer while the original document in its native page order is displayed in another layer.

In the above-described embodiments, the ranking is page-based, i.e., the individual pages are ranked and displayed in a sequence according to the ranking. Alternatively or in addition, section-based or chapter-based ranking or other unit-based ranking may be calculated; in other words, the numbers of different types of user interactions are aggregated for each unit (section, chapter, etc.) of the document to calculate the aggregate scores, and the ranking and sequencing of display are done unit-by-unit based on the scores. The viewer application correspondingly provides an alternative or additional menu to allow the user to select a mode of unit-based ranking, such as "Most Important Sections," "Most visited Chapters," etc. Those skilled in the relevant art can implement these alternatives by modifying the page-based methods described above without undue experimentation.

In another embodiment, the personalization service 2 analyzes how multiple documents are correlated based on how user browses these documents in a pattern. The personalization service 2 will analyze and recognize the pattern. When user attempts to open one of the related documents, then user will be presented with the combined view of the most frequently used pages or chapters of the related documents.

Referring back to FIG. 1, the various embodiments of the document display personalization method described above rely on the cooperation of the client 3 (e.g. via the personalization plug-in 34) and the server 1 (e.g. via the personalization module 15 and the personalization service 2), which communicate with each other via the network 5. In an alternative embodiment, the document display personalization method may be implemented in an offline mode, where the user interaction information is stored on the client 3 and the client analyzes the user interaction information to generate various page rankings for the documents. The user interaction information can be stored in a memory of the client 3 separate from the document, or be stored as a part of the document's metadata.

Also, although the document display personalization method described above is implemented in conjunction with a DRM system, this is not required; the method can be implemented separately from a DRM system. In other words, steps S11 to S13, The personalization service only needs to be provided with the user IDs and document IDs so that it can correlate the user interaction reports with document IDs and user IDs.

To summarize, one of the key features of embodiments of the present invention is to generate the page sequence for display based on the history of the user's interactions with the document. Another feature is to provide different ranking modes of reorganizing the display of a document based on the user interaction history.

Although specific examples of the user interface displays are shown in FIGS. 6(*a*)-(*c*), the invention is not limited to the specifics of the user interface displays. The invention may be implemented using any forms of user interface displays, as long as the user interface display can adequately display the document and includes input means that allows the user to specify various settings and choices. The user interface may use buttons, check boxes, radio buttons, text input fields, drop-down menus, pop-up menus, icons, tabs for bringing up different sheets, separate windows, etc., or combinations thereof, or any other suitable structure of allowing the user to input information to the computer. The term "user interface display" is used to generally mean any suitable screen display that displays information to the user and/or allows the user to input commands and other information, and is not limited to any specific form of display, and may include a series of consecutive displays.

It will be apparent to those skilled in the art that various modification and variations can be made in the document display personalization method and related apparatus of the present invention without departing from the spirit or scope of the invention. Thus, it is intended that the present invention cover modifications and variations that come within the scope of the appended claims and their equivalents.

What is claimed is:

1. A method implemented in a system comprising a server computer connected with a client computer for personalized display of a digital document by the client to a user, the digital document being an individually accessible file and having multiple pages arranged in a native page order, the method comprising:

by the server computer:

receiving, from the client computer, user interaction information regarding interactions of the user with the document, the interactions including one or more types of interactions selected from a group consisting of: viewing a page of the document, making a note on a page, printing a page, modifying a page, sharing a page with others, copying or cutting content from a page and pasting it in another document, navigating to a page while viewing another document, and navigating from a page to another document;

storing the user interaction information in association with a user ID of the user and a document ID of the document;

generating page ranking information based on the stored user interaction information, the page ranking information being either one or more scores for each page of the document, or one or more page sequences of the document different from the native page order; and transmitting the page ranking information to the client computer in response to a request from the client computer.

2. The method of claim 1, wherein the generating step includes:

deriving the one or more scores for each page of the document, the scores being derived from the stored user interaction information; and ranking the pages of the document into the one or more page sequences based on the corresponding one or more scores.

3. The method of claim 2, wherein the stored user interaction information include cumulative numbers of times the user performed respective types of user interaction on each page of the document, wherein the one or more scores for each page include a score indicating a number of notes within the page, a score indicating a number of times the page is viewed, a score indicating a number of times the page is edited, and a score indicating a number of times the page is printed, and an importance score calculated from a weighted sum of the cumulative numbers.

4. The method of claim 2, further comprising:
deriving one or more aggregate scores for each unit of the document, the aggregate scores being derived from the stored user interaction information;
ranking the units of the document into one or more unit sequences based on the corresponding one or more aggregate scores; and
transmitting the ranked unit sequences to the client computer in response to the request from the client computer.

5. The method of claim 1, further comprising:
by the client computer:
displaying the document on a screen;
transmitting the user interaction information to the server computer;
receiving the page ranking information from the server computer; and
displaying pages of the document in a sequence according to the page ranking information.

6. A method implemented on a client computer connected with a server computer for performing personalized display of a digital document to a user, the digital document being an individually accessible file and having multiple pages arranged in a native page order, the method comprising:
displaying the document on a screen;
transmitting, to the server computer, user interaction information regarding interactions of the user with the document, the interactions including one or more types of interactions selected from: viewing a page of the document, making a note on a page, printing a page, modifying a page, sharing a page with others, copying or cutting content from a page and pasting it in another document, navigating to a page while viewing another document, and navigating from a page to another document;
receiving page ranking information from the server computer, the page ranking information being either one or more scores for each page of the document, or one or more page sequences of the document different from the native page order, the page ranking information having been generated by the server computer based on the user interaction information transmitted by the client computer to the server computer; and
displaying pages of the document in a sequence according to the page ranking information, the displayed page sequence being different from the native page order.

7. The method of claim 6, wherein the page ranking information includes a plurality of page sequences, each page sequence corresponding to one of a plurality of page ranking modes;
the method further comprising:
displaying a menu listing the plurality of page ranking modes;
receiving a user selection of one of the page ranking modes; and
displaying pages of the document according to the page sequence corresponding to the selected page ranking mode.

8. The method of claim 7, wherein the plurality of page ranking modes include ranking modes selected from a group consisting of: a ranking mode based on a number of notes within each page, a ranking mode based on a number of times each page is viewed, a ranking mode based on a number of times each page is edited, a ranking mode based on a number of times each page is printed, and a ranking mode based on an importance score for each page calculated from a weighted sum of the above numbers.

9. The method of claim 6, further comprising:
receiving, from the server computer, one or more unit sequences of the document, each unit being a section or chapter of the document, the unit sequences having been generated by the server computer based on the user interaction information transmitted by the client computer to the server computer; and
displaying pages of the document according to one of the unit sequences.

10. The method of claim 6, wherein the page ranking information received from the server computer includes an importance score of each page, the method further comprising:
receiving input from the user representing manually assigned importance scores of one or more pages;
generating a page sequence based on the importance score of each page as received from the server computer and modified by the input from the user; and
displaying pages of the document according to the page sequence.

11. The method of claim 6, wherein the page ranking information received from the server computer includes an importance score of each page, and
wherein the displaying step comprises displaying pages of the document according to the importance score while hiding all pages of the document having an importance score equal to or below a predetermined value.

12. The method of claim 6, wherein the page ranking information received from the server computer includes a page sequence, the method further comprising:
receiving input values from the user representing a manual modification of the page sequence received from the server computer; and
displaying pages of the document according to the modified page sequence.

13. A computer program product comprising a computer usable non-transitory medium having a computer readable program code embedded therein for controlling a client computer connected with a server computer for carrying out a process for personalized display of a digital document to a user, the digital document being an individually accessible file and having multiple pages arranged in a native page order, the process comprising:
displaying the document on a screen;
transmitting, to the server computer, user interaction information regarding interactions of the user with the document, the interactions including one or more types of interactions selected from: viewing a page of the document, making a note on a page, printing a page, modifying a page, sharing a page with others, copying or cutting content from a page and pasting it in another document, navigating to a page while viewing another document, and navigating from a page to another document;

receiving page ranking information from the server computer, the page ranking information being either one or more scores for each page of the document, or one or more page sequences of the document different from the native page order, the page ranking information having been generated by the server computer based on the user interaction information transmitted by the client computer to the server computer; and displaying pages of the document in a sequence according to the page ranking information, the displayed page sequence being different from the native page order.

14. The computer program product of claim 13, wherein the page ranking information includes a plurality of page sequences, each page sequence corresponding to one of a plurality of page ranking modes;

wherein the process further comprises:

displaying a menu listing the plurality of page ranking modes;

receiving a user selection of one of the page ranking modes; and displaying pages of the document according to the page sequence corresponding to the selected page ranking mode.

15. The computer program product of claim 14, wherein the plurality of page ranking modes include ranking modes selected from a group consisting of: a ranking mode based on a number of notes within each page, a ranking mode based on a number of times each page is viewed, a ranking mode based on a number of times each page is edited, a ranking mode based on a number of times each page is printed, and a ranking mode based on an importance score for each page calculated from a weighted sum of the above numbers.

16. The computer program product of claim 13, wherein the process further comprises:

receiving, from the server computer, one or more unit sequences of the document, each unit being a section or chapter of the document, the unit sequences having been generated by the server computer based on the user interaction information transmitted by the client computer to the server computer; and displaying pages of the document according to one of the unit sequences.

17. The computer program product of claim 13, wherein the page ranking information received from the server computer includes an importance score of each page, and wherein the process further comprises:

receiving input from the user representing manually assigned importance scores of one or more pages;

generating a page sequence based on the importance score of each page as received from the server computer and modified by the input from the user; and displaying pages of the document according to the page sequence.

18. The computer program product of claim 13, wherein the page ranking information received from the server computer includes an importance score of each page, and wherein the displaying step comprises displaying pages of the document according to the importance score while hiding all pages of the document having an importance score equal to or below a predetermined value.

19. The computer program product of claim 13, wherein the page ranking information received from the server computer includes a page sequence, and wherein the process further comprises:

receiving input values from the user representing a manual modification of the page sequence received from the server computer; and displaying pages of the document according to the modified page sequence.

* * * * *